United States Patent [19]

Asmus et al.

[11] 4,338,623

[45] Jul. 6, 1982

[54] VIDEO CIRCUIT WITH SCREEN-BURN-IN PROTECTION

[75] Inventors: Jean-Pierre Asmus, Marly-le-Roi; Joseph Soto, Montrouge, both of France; Sebastianus J. Op Het Veld, Henri W. Schneider, both of Eindhoven, Netherlands

[73] Assignee: U.S. Philips Corporation, New York, N.Y.

[21] Appl. No.: 145,079

[22] Filed: Apr. 30, 1980

Related U.S. Application Data

[63] Continuation of Ser. No. 957,395, Nov. 3, 1978, abandoned.

[30] Foreign Application Priority Data

Oct. 11, 1977 [FR] France .............................. 77 380547
Oct. 4, 1978 [FR] France .............................. 78 28418

[51] Int. Cl.³ ...................... H04N 5/22; H01J 29/52; A63B 71/00; G09F 9/32
[52] U.S. Cl. ...................................... 358/22; 315/380; 273/138 A; 273/DIG. 28; 340/713; 340/723; 358/220
[58] Field of Search .............. 358/21 R, 41, 165, 188, 358/220, 22; 340/734, 742, 713, 720, 723, 789, 793; 315/381, 380; 273/DIG. 28, 138 A; 364/521

[56] References Cited

U.S. PATENT DOCUMENTS

| 3,308,333 | 3/1967 | Lent ................................... 315/381 |
| 3,958,152 | 5/1976 | Fogg et al. ........................ 315/381 |
| 3,963,961 | 6/1976 | Ray et al. ......................... 315/381 |
| 3,995,197 | 11/1976 | Caswell ......................... 315/381 X |
| 4,130,830 | 12/1978 | Derickson ...................... 358/220 X |

FOREIGN PATENT DOCUMENTS 2333391  1/1975  Fed. Rep. of Germany ...... 315/381

OTHER PUBLICATIONS

Home Library Computer: Scientific American, Sep. 1977, pp. 16-17.
Video Games: Consumer Reports, Nov. 1977, pp. 630-634.

Primary Examiner—Aristotelis M. Psitos
Attorney, Agent, or Firm—Thomas A. Briody; William J. Streeter; Edward W. Goodman

[57] ABSTRACT

To prevent display screen burn-in of a picture having, for example, bright lines or other picture components remaining stationary for a long period of time, a video circuit is examined to detect how long the information has not been changed. If a predetermined time limit is exceeded, the picture brightness is limited to a sufficiently low average value or, if so desired, to zero brightness, by means of one or more protection switches.

13 Claims, 21 Drawing Figures

VIDEO CIRCUIT WITH SCREEN-BURN-IN PROTECTION

This is a continuation of application Ser. No. 957,395, filed Nov. 3, 1978, now abandoned.

BACKGROUND OF THE INVENTION

The invention relates to a video circuit for generating video signals for displaying pictures on a picture screen, the video circuit comprising a picture signal source, at least one luminance circuit coupled thereto for generating a luminance signal, and a protection circuit for protecting the picture screen from burning-in due to a prolonged stationary picture.

Video signals of this type are used for generating at least a Y-luminance signal and/or R-, G- and B- luminance signals for the pictorial display of information from an information processing device, including Teletext and Viewdata systems as well as video-games.

The luminance signals can be applied to corresponding inputs of a display device or can be modulated on a carrier and applied to an aerial input of a television receiving device.

It frequently happens that a certain picture remains stationary on the picture screen for a long period of time, so that bright portions of the picture may cause an accelerated local burning-in of the picture screen. Particularly, it often happens that users forget to switch off a television game so that, for example, a line pattern of a playing-field remains on the screen for a whole night. The video circuit is provided with a protection circuit which tries to obviate this harmful effect.

A video circuit of the type defined in the preamble is known from Canadian patent application No. 267,742. In this video circuit the protection circuit comprises a temperature-dependent element which has the effect that the picture to be displayed is slowly moved over a short distance across the picture screen due to variations in the ambient temperature. However, it appeared that in rooms having a thermostatically controlled heating system, a temperature is adjusted at the beginning of a night which remains very constant thereafter, which is partly caused by the fact that, for example, doors and windows remain closed for a long period of time so that the picture can still remain stationary hours on end in the same position on the picture screen for the remainder of the night.

SUMMARY OF THE INVENTION

It is an object of the invention to provide a video circuit of the type mentioned in the preamble which prevents burning-in of the picture screen in all circumstances.

According to the invention a video circuit is therefore characterized in that the protection circuit comprises an electric protection switch for suppressing in a switched-off state completely or partly the luminance signal generated in the video circuit, a detection circuit for detecting changes in a electric signal of the picture signal source, and a timer circuit, a detection output of the detection circuit being coupled to a starting input of the timer circuit, a time signal output thereof being coupled to a control input of the protection switch in such a manner that this switch is adjusted to the switched-off state when the detection circuit has not detected a signal change for a period of time determined by the timer circuit.

This object is achieved in a surprisingly simple and inexpensive manner wherein, if the display device is not supplied with new information and is not switched off, the picture luminance for all picture elements of the picture screen, after the period of time determined by the timer circuit, is reduced to zero, or to such a low average value that burning in is completely, or substantially, completely obviated.

DESCRIPTION OF THE DRAWINGS

Several embodiments, as set forth in the claims 2 to 13, inclusive, are possible for the protection switch as well as for the detection circuit and the timer circuit. These embodiments will be further explained by way of non-limitative examples with reference to the Figures and the description of these Figures.

Figure 1:
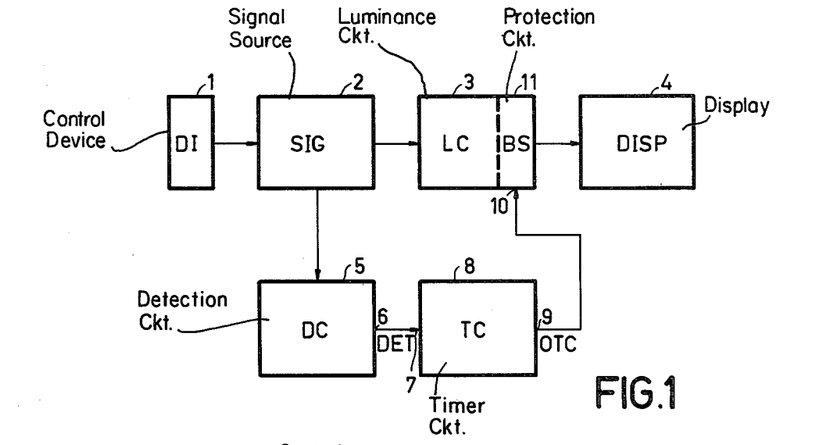
FIG. 1 shows a simplified block diagram of a video circuit having a protection switch for suppressing a luminance signal.

In FIG. 1 a control device 1 is coupled to a picture signal source 2. Usually the control device 1 comprises one or more control elements which are known per se, such as push-buttons, touch controls, switches or rotary potentiometers, these potentiometers being some times operated by means of a so-called "joystick". The picture signal source 2 serves for building up the complete picture information for the chosen purpose. The picture information controls at least one luminance circuit 3, which is coupled to the picture signal source 2, for applying a luminance signal to the display device 4.

DESCRIPTION OF THE PREFERRED EMBODIMENTS

For the display of color pictures three luminance circuits 3 are generally used for the R-, G- and B- luminance signals.

The coupling between the control device 1 and the picture signal source 2 may, if so desired, be effected by means of a remote control channel with signal transfer by means of, for example, infrared radiation.

Figure 15:
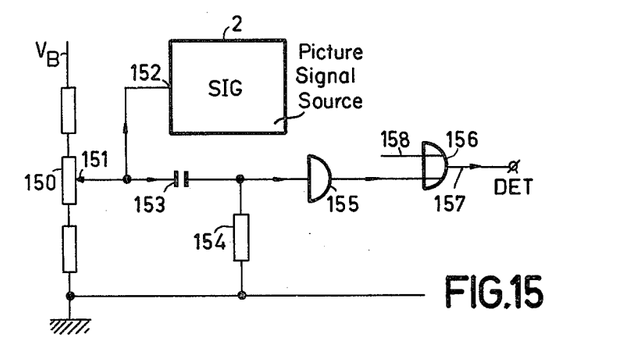
FIG. 15 shows a diagram of a simple detection circuit.

At least one signal of the picture signal source 2 is applied to a detection circuit 5 having a detection output 6 for an electric detection signal. This detection signal is pulse-shaped and is produced after a change in the signal derived from the picture signal source 2, which detected signal can be derived from a control signal applied to the picture signal source 2 by the control device 1 as well as from a new signal device, e.g. as shown in FIG. 15. It is of course, possible to apply two or more signals to the detection circuit 5 such that the detection circuit 5 generates a detection signal as soon as at least one of these signals evidences a change. Examples thereof are given in FIG. 4 and subsequent Figures. The output 6 of the detection circuit 5 is coupled to an input 7 of a timer circuit 8 having a time signal output 9. The timer circuit 8 is a circuit block which is known per se, for example a monostable multi-vibration circuit or a digital counting circuit. The timer circuit 8 is adjusted to a starting position, the "0"-position, by a detection signal at its input 7. As long as no new detection signal is generated, the timer circuit 8 starts operating because, for example, a capacitor voltage increases monotonously as a function of the time and causes a monostable multivibrator to change state after a period of time determined by the circuit blocks, or the counting position increase under the control of a clock signal up to a predetermined maximum counting position. At the end of the predetermined period of time, the timer circuit 8 produces an output signal OTC at its output 9. If however, a new detection signal appears before the predetermined period of time has elapsed, the timer circuit 8 is again adjusted to the "0"-position. The time constant of the timer circuit is chosen considerably longer than the period of time which may occur between information changes during normal use of the system, for example one minute or longer. In the situation that no change is produced in the picture information for a longer period than the predetermined period of time, the signal OTC will be generated.

The output 9 of the timer circuit 8 is coupled to an input 10 of a protection circuit 11, which, in this example, is directly coupled to the luminance circuit 3. The protection circuit 11 is arranged so that it completely or partly suppresses the luminance signal as soon as the timer circuit 8 has attained its maximum position and remains in this condition until a restart command is given. In this manner inadvertent picture screen burn-in in the display device 4 cause a stationary picture, for example bright reference lines, originating from a calculator, teletext system, television game etc. being displayed for a long period of time with a high intensity on a fixed portion of the screen, is prevented. Just because of the fact that other portions of the screen are not burned-in, even rather small differences in intensity can visually be very annoying during subsequent use.

Figure 2:
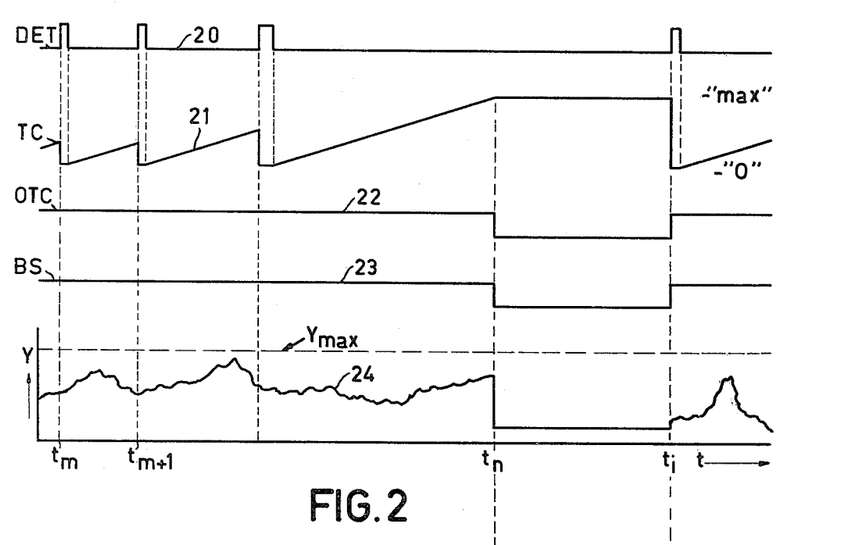
FIG. 2 shows a time diagram of the most important electric signals of the protection circuit.

The time diagram of FIG. 2 illustrates the procedure. Herein the line 20 shows the pulses of the detection signal and the line 21 shows a characteristic magnitude of the timer circuit 8, linearly increasing, by way of example, from "0" to a maximum value "max". If a detection signal is produced at the instant $t_m$ the timer circuit is adjusted to the "0" position and this is repeated at the instant $t_{m+1}$ etc., the "max"-position not having been attained. Only when nothing has happened for a long period of time, the timer circuit 8 arrives at the position "max" at $t_n$ and remains in this position until a new detection signal arrives at, for example, the instant $t_i$. The line 22 shows the output signal OTC of the timer circuit 8, indicated arbitrarily as "ON" or "1" in the normal situation and "OFF" or "0" in the position "max". The output signal OTC adjusts the protection circuit 11 to the "OFF"-position, as shown by curve 23, so that finally the luminance signal Y for black-white display, indicated by the curve 24 between $t_n$ and $t_i$, is completely or largely suppressed.

Figure 3:
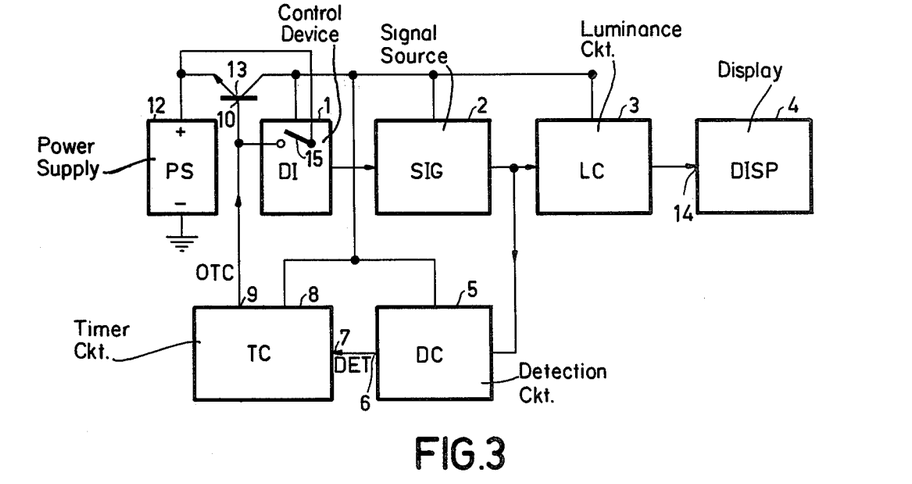
FIG. 3 shows a simplified block diagram of a video circuit having a protection switch for switching-off a supply voltage.

FIG. 3 shows a further embodiment of the invention. In this Figure and in subsequent Figures, corresponding elements are always given the same reference numerals.

The elements 1, 2, 3, 4, 5 and 8 have the same function as in FIG. 1.

The FIG. 3 now also includes a power supply 12, for example a battery, which applies a supply voltage to the other portions of the video circuit through a transistor 13, the base of which constitutes the input 10 of the protection circuit.

As long as the signal OTC at the output 9 of the timer circuit 8 is "ON" the transistor 13 conducts and the video circuit is supplied with the supply voltage. If the signal OTC becomes "OFF" at, for example, the instant $t_n$, transistor 13 cuts off the supply voltage so that, obviously OTC will now remain in the "OFF" position. Now the timer circuit 8 need not have a holding function. Although it is sufficient for this purpose to block only the supply voltage of the timer circuit 8 it may be desirable to block the entire supply. In the case of a battery supply this is useful to prolong the life of the battery. A further advantage occurs when a television receiver is used as the display device 4, if the luminance signal, modulated on a carrier, is applied to an aerial input 14 of the receiver. When the supply voltage disappears, the carrier also disappears, in response whereto the majority of receivers start hissing and thus furnish an audible warning for the user. A further possibility is, in receivers having a so-called "stand-by" switch, to set this switch to the "stand-by" position as soon as the supply voltage disappears.

FIG. 3 shows the circuit of the transistor 13 schematically only. The design of a suitable circuit is outside the scope of the invention and should be evident to the average person skilled in the art.

If, in addition to the timer circuit 8, also further components, such as the picture signal source 2 or the detection circuit 5 are switched-off, a new control signal will not automatically effect a restart. The transistor 13 may then be reset to the conducting state by means of a switch 15, which is here assumed to be included in the control device 1. The switch 15 may, for example, be implemented as a push-button on as a second contact provided or a control element which is already present for other reasons.

Figure 4:
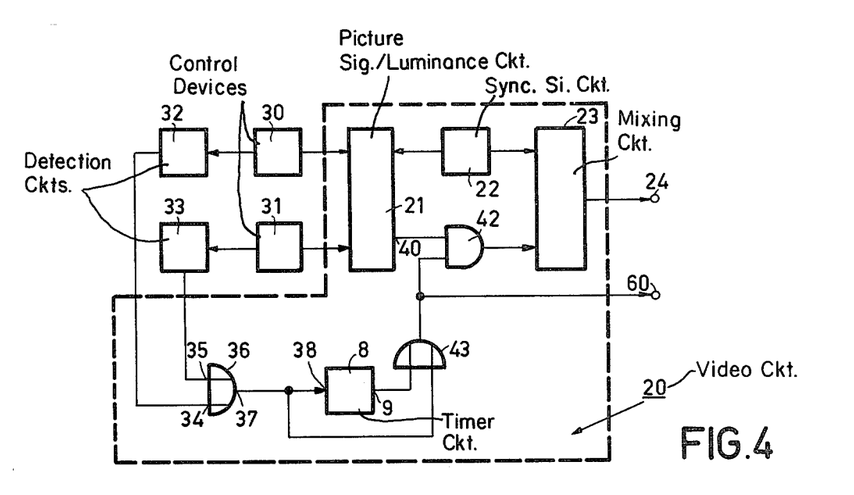
FIG. 4 shows a block diagram for suppressing the luminance signal for a black-white display device.

FIG. 4 shows schematically a video circuit 20 comprising a picture signal source and a luminance circuit in the form of a block 21, a synchronization signal circuit 22 and a mixing circuit 23 having a output 24 for a video signal modulated on a carrier. In addition to the video circuit, two control devices 30, 31 are coupled to control inputs of the picture signal source 21 and also to two detection circuits 32, 33 for detecting a control operation. Outputs thereof are coupled to corresponding inputs 34, 35 of an OR-gate 36, an output 37 of which is coupled to an input 38 of a timer circuit 8 having a time signal output 9. The luminance signal at the output 40 of the luminance circuit 21 is applied to the mixer circuit 23 through an AND-gate 42 for the time the signal OTC at the output 9 of the timer circuit 8 is "ON." In the case a detection signal does not immediately result in a luminance signal after a re-start, due to the flyback time of a monostable multivibrator having a long time constant, the detection signal is applied, if so desired, to the AND-gate 42 through an OR-gate 43. However, since the OR-gate 43 is not essential, it is alternatively possible to connect the output 9 of the timer circuit 8 directly to the input of an AND-gate 42. It will be obvious that the AND-gate 42 cuts off the luminance signal as soon as the time signal OTC becomes "OFF."

Figure 5:
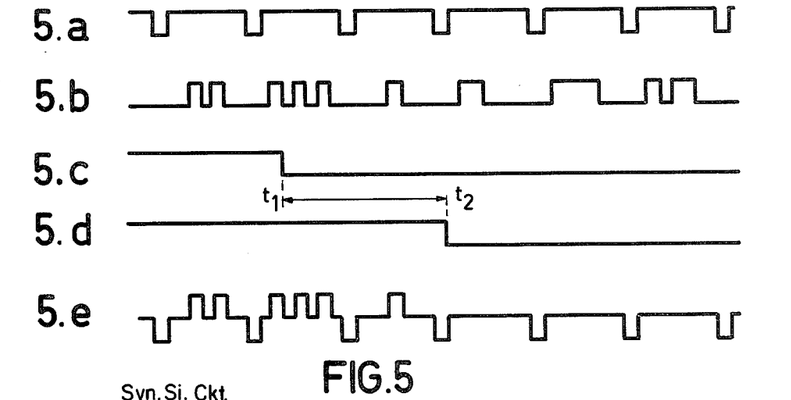
FIG. 5, including a-e, shows a time diagram for a video circuit as shown in FIG. 4.

FIGS. 5a to 5c inclusive show a simplified time diagram for the synchronization signal (5a), the picture information signal (5b) which can be modulated together as the video signal (5c) on a carrier by the modulation circuit 23.

FIG. 5c shows the end of a detection signal at an instant $t_1$ and FIG. 5d shows the variation of the signal OTC which becomes "OFF" after a long period of time has elapsed. This time diagram is shown in a compressed form, actually there are many synchronization pulses between $t_1$ and $t_2$. The information signal is applied to the modulator 23 until the instant $t_2$, from this instant $t_2$ the AND-gate 42 blocks the information signal so that only the synchronization signal is applied to the modulator 23 and the picture on the display screen goes dark.

It may be desirable that the picture is not completely suppressed but that it is limited to a picture having a harmless luminance level. It appears that no noticeable burn-in phenomena occurs when the luminance level is limited to approximately 50% of the maximum luminance level.

Figures 6, 7:
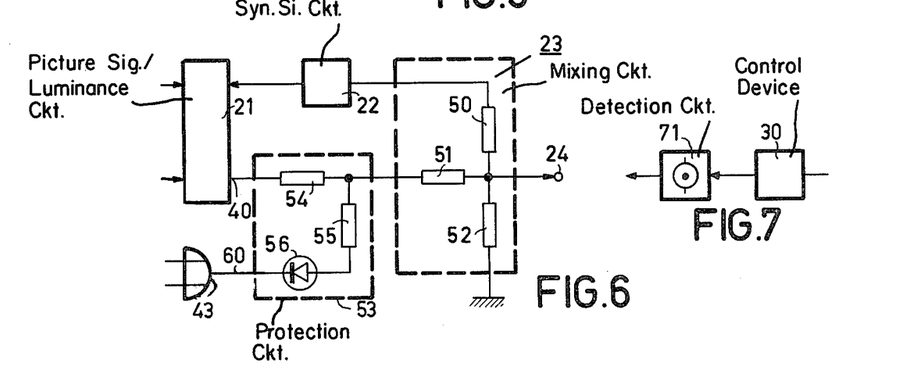
FIG. 6 shows a detailed circuit of a further embodiment with suppression of the luminance signal for a black/white display device.
FIG. 7 shows, schematically, an example of the use of a touch contact in a video circuit as shown in FIG. 4 or FIG. 6.

FIG. 6 shows an embodiment in which the luminance level is limited. An example of a circuit 23 having resistors 50, 51, 52 is symbolically shown, whereas the carrier modulation is not shown for the sake of clarity. The modulator 23 functions in a manner which is known per se.

In this embodiment the AND-gate 42 is replaced by a protection circuit 53 consisting of a series arrangement of a resistor 54, an adjustable resistor 55 and a diode 56. An anode of the diode 56 is connected to the adjustable resistor 55, a cathode to the output of the OR-gate 43, or directly to the output 9 of the timer circuit 8, the output 40 of the block 21 carrying the luminance signal is connected to one end of the resistor 54 and the junction of resistors 54, 55 is connected to the modulator 23.

Taking the use of a positive supply voltage in the video circuit 20 as the starting point, the cathode of the diode 56 is normally at a positive voltage if OTC is "ON", diode 56 then being cut-off. The luminance signal is passed on to the modulator 23 through the resistor 54.

As soon as OTC becomes "OFF," the diode 56 is conductive and the luminance signal is reduced by the additional load formed by the series arrangement 55, 56. Alternatively, it is possible to combine the resistors 54, 55 into one adjustable resistance potentiometer.

In FIG. 4 and FIG. 6, an output 60 of the video circuit 20 is connected to the output of the OR-gate 43. In the case the video circuit 20 can be included entirely in a television receiver, the output signal of the OR-gate 43 can be used to switch the receiver over to television reception. If the OR-gate 43 is omitted, the output 60 can be coupled to the output 9 of the timer circuit 8.

FIG. 7 shows schematically that a detection circuit 71 for a control device 30 may be in the form of a touch contact whose change in voltage, produced when the control device is touched, can be applied to the timer circuit.

Figure 8:
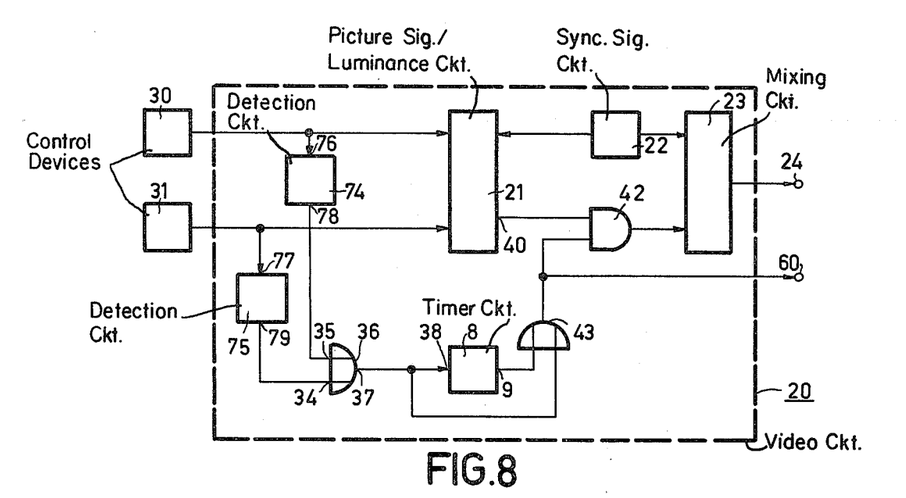
FIG. 8 shows a further embodiment of a video circuit according to the invention.

FIG. 8 shows a slightly different arrangement of the elements. In the Figure, two detection circuits 74, 75 are now included in the video circuit, their inputs 76 and 77, respectively, being coupled to the outputs of the corresponding control devices 30, 31, whereas their outputs 78 and 79, respectively, are connected to the inputs 35 and 34, respectively, of the OR-GATE 37.

Figure 9:
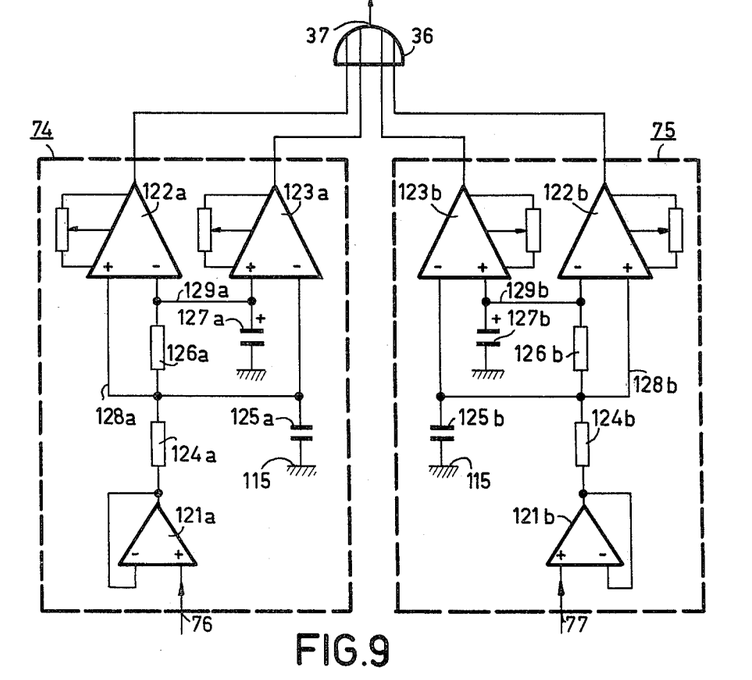
FIG. 9 shows a wiring diagram for a detection circuit having timing circuits.

FIG. 9 shows an embodiment of the detection circuits 74, 75. Each of these detection circuits is provided at the input side (76 and 77, respectively) with an impedance matching circuit 122a, b, followed by two pairs of comparator circuits 122a, 123a and 122b, 123b the four outputs of which are connected to four corresponding inputs of OR-gate 36.

Of each pair of two comparator circuits, the inputs of opposite polarities are mutually interconnected, one of these connections 128a, 128b being coupled to the output of the respective impedance matching circuit 121a, b through a RC circuit 124a, b and 125a, b, and the other connections 129a, b through an additional RC circuit 126a, b and 127a, b, the total time delay between 121 and 129 consequently being greater than the total time delay between 121 and 128.

As soon as the input signal at, for example, the input 76 of detection circuit 74 varies, either the comparator 122a or 123a will effect an output signal which induces the "OFF"-condition and the output 37 of the R-gate 36 will temporarily become "ON".

In the absence of an operation all inputs of the comparators will assume an equal voltage level and the output voltage of the OR-gate becomes equal to "0".

If the time constant of the RC circuits 126, 127 is chosen sufficiently high, that is to say in the order of magnitude of one minute or longer, they perform also the function of the timer circuit 8 so that the output 37 of the OR-gate 36 can be connected directly to the OR-gate 43 or to the AND-gate 42.

Figure 10:
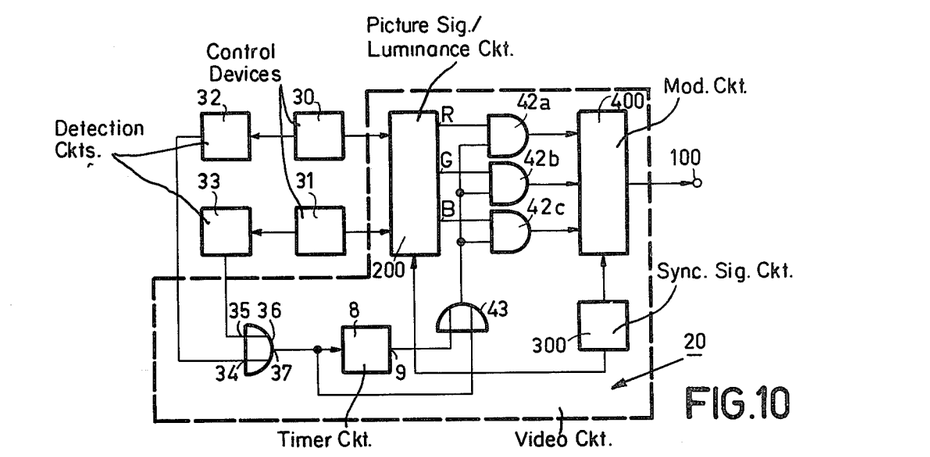
FIGS. 10 to 13, inclusive show four embodiments of video circuits comprising a protection circuit, for use in color display devices.
Figure 11:
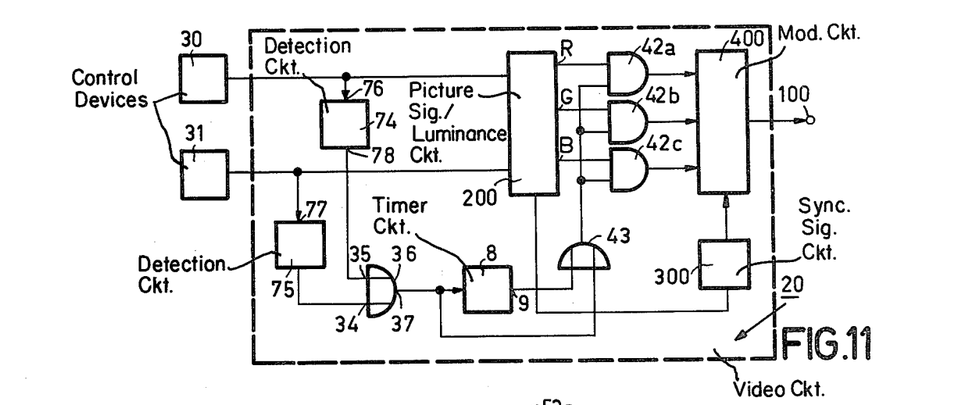
Figure 12:
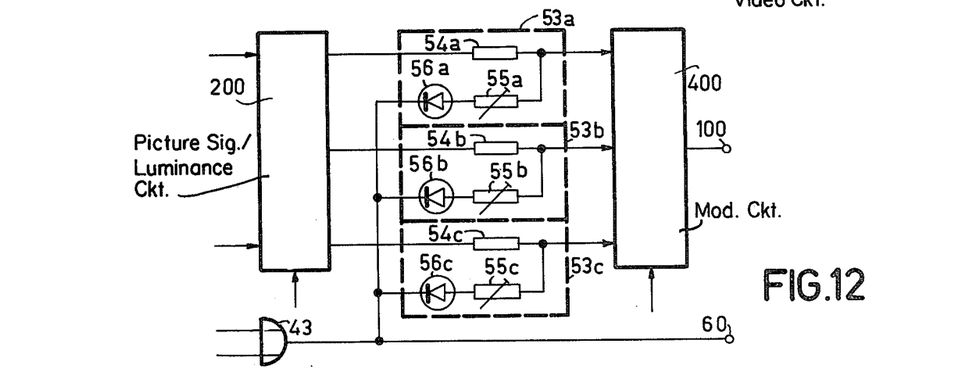

The FIGS. 10, 11 and 12 show implementations for the display of color pictures, but otherwise they fully correspond to circuits shown in FIG. 4, FIG. 8 and FIG. 6, respectively.

In these FIGS. 10, 11 and 12 three protection switches 42a, b, c or circuits 53a, b, c are included between the picture signal source and luminance circuit 200, having three outputs for R, G and B, and a modulation circuit 400 in accordance with, for example, the PAL system or the SECAM system, this modulation circuit 400 furthermore being coupled to a synchronization signal circuit 300. An output 100 of the modulation circuit 400 can be coupled to an aerial input of a television receiver. It is obvious that the modulation circuit 400 can be omitted if the television receiver comprises separate video inputs R, G, B and SYNC, as is usually the case at present, inter alia to enable the connection of video recorders.

Figure 13:
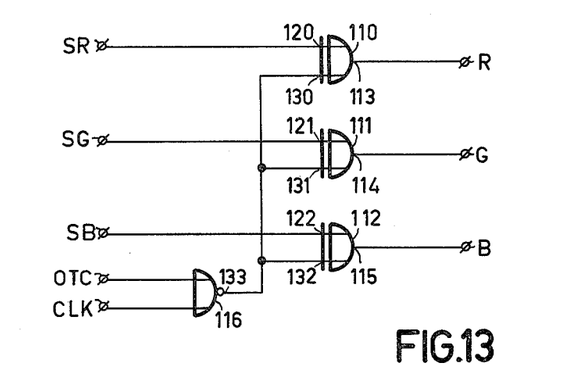

A very simple solution in the case of color display is shown in FIG. 13, in which the protection circuit is implemented with three EXCLUSIVE-OR gates 110, 111 and 112 having outputs 113, 114 and 115, respectively, which produce the R, G and B signals and a NOR-gate 116. For a simple video circuit the color information is given with three one-bit signals SR, SG and SB so that eight colors, including black and white, are formed with the various "0" and "1" combinations. These one-bit signals are applied to first inputs 120, 121 and 122, respectively, of the EXCLUSIVE-OR gates 110, 111 and 112 respectively, second inputs 130, 131 and 132, respectively, of which are jointly connected to the output 133 of the NOR-gate 116. For the period of time this output is "0", R, G and B correspond to SR, SG and SB, respectively. The signal OTC and a clock signal are applied to the inputs of the NOR-gate 116. For the time OTC is "ON" during normal use the output 133 of the NOR-gate 116 is "OFF". If, however, OTC becomes "OFF", 116 follows the clock signal CLK and in response thereto becomes alternately "ON" and "OFF" in the rhythm of CLK: Each time the output 133 is "ON", the combination R, G and B becomes precisely the inverse of the combination SR, SG and SB, respectively 000 is replaced by 111, 011 by 100 etc., so that now alternately the colors determined by SR, SG and SB or a color which is complementary thereto is passed on through R, G and B. If one or more of the color signals is "1", the result becomes alternately "0" and "1" so that each color signal has an average luminance equal to 50% of the maximum luminance.

Figure 14:
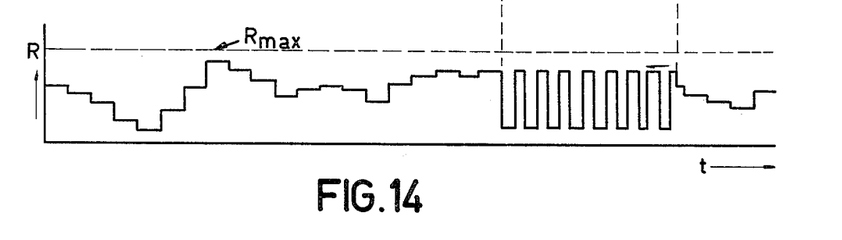
FIG. 14 shows a time diagram associated with the embodiment shown in FIG. 13.

For R, for example, this is illustrated in the time diagram of FIG. 14 having the same time axis as that of FIG. 2.

Until the instant $t_n$, R remains identical to a signal SR, which, for clarity, is shown as a multi-bit signal, of which all bits of all three color luminance signals can be switched-over when OTC=0". After $t_n$, or already before that instant, SR does not change anymore and is maintained at a, in this example, high amplitude a at the appearance of OTC="0". All bits are periodically and simultaneously inverted in the rhythm of CLK so that R periodically assumes the value ("max"−a), average ½ "max", which follows from $$[a+("max"-a)]/2$$

The same happens for the other color. The pattern obtained last remains visible on the picture screen but with a markedly reduced average brightness.

The clock frequency can be chosen at will within very wide limits. Examples are the use of a second signal of a clock present in the device, a 50 (or 60) Hz clocking voltage derived from the line frequency etc.

FIG. 15 shows a very simple and inexpensive, but nevertheless effective, detection circuit for use with a television game. To detect the change in the position of an adjustable resistance potentiometer whose wiper 151 is coupled to an input 152 of the picture signal source 2, the wiper 151 is also connected to a RC differentiating network 153, 154. The differentiated signal is applied to a pulse-shaper 155, for example an OR-gate, an AND-gate with interconnected AND-inputs or an inverting circuit. When the wiper 151 moves, this pulse-shaper 155 produces, in the two first-mentioned pulse-shaper examples a "1"-pulse if the voltage taken from the resistance potentiometer increases and, in the example of an inverting pulse-shaper, if this voltage decreases. If the video circuit is intended for a television game for two players, this detection pulse can be combined with the detection pulse derived from a resistance potentiometer intended for the opponent, by combining the two signals with an OR-gate 156 to form the detection signal DET which is applied to the timer circuit 8 via the output 157 of this gate 156.

As some games are played by one player only, as, for example, in a cardgame, the potentiometer 150 then used must in any case be connected. As also in the case of two players, one player will operate his own potentiometer several times per minute in alternating directions, the second potentiometer generally need not of necessity be provided with a detection circuit.

In that case the OR-gate 156 can be dispensed with or be used for, for example, to connect another control element, such as a touch contact, to an additional input 158.

Figure 16:
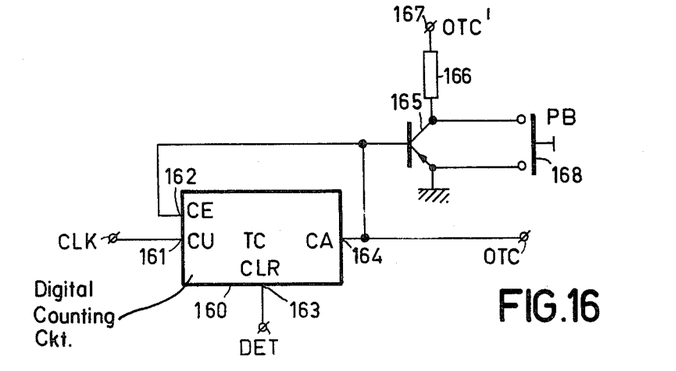
FIG. 16 shows a simplified block diagram of a timer circuit implemented with a digital counting circuit.

Finally, FIG. 16 shows a simple timer circuit formed by means of a digital counting circuit 160 having a counting input 161, a count enable input 162, a resetting input 163 and a counting output 164.

The counting input 161 can be connected to a similar clock signal as mentioned for FIG. 13, for example 1 Hz.

The resetting input 163 is connected to the detection output 6 of the detection circuit 5 so that the counting circuit 160 is adjusted to the "0"-position by each detection signal, whereafter it starts adding in the clock rhythm. If no new detection signals are produced, the counting position finally arrives at its maximum position, given by a decoding of the counter bits. This may, for example, be the highest position, given by an "OFF"-going carry signal at the counter output 164. for a 1 Hz clock and a 6-bit counter this position is obtained after something more than 1 minute, if no subsequent detection signals DET appear.

To prevent the counter from continuing to count after "111111" at CLK to "000000", the output 164 is connected to the count enable input 162 so that the counter stops as soon as CA, and consequently CE, becomes "OFF". As soon as signal DET is produced again the counter is, however, reset. Several known digital counting circuits can be used as the counting circuit such as, for example, a Signetics type 54161, or two or more cascaded counting circuits of this type if more than 4 bits are required. The output signal CA at the counter output 164 is at the same time the time signal OTC.

If the transistor 13 of FIG. 3 is coupled by means of its emitter side to the power supply 12, the base of this transistor 13 can be driven by an inverter circuit consisting of a switching transistor 165 having collector resistor 166 an end 167 thereof being connected to the base of the transistor 13. As soon as OTC is "OFF", the transistor 13 does not receive any base current and is cut-off. Normally, however, OTC is "ON", transistor 165 conducts and transistor 13 receives a base current which is largely determined by the resistance value of the resistor 166.

In this example, a restart is possible by shunting the transistor 165 by a re-starting contact 168.

It will be obvious that the above examples are only given as an illustration of the inventive idea and that they are not limited to the form chosen, numerous variations are possible while maintaining the inventive idea. Several combinations of various detection circuits, timer circuits and protection switches are also possible.

What is claimed is:

1. A video circuit for generating video signals for displaying pictures on a picture screen, the video circuit comprising a picture signal source for providing picture signals containing visual picture information, means for controlling said picture signal source coupled thereto, at least one luminance circuit coupled to said picture signal source for generating a luminance signal, and a protection circuit coupled to said luminance circuit for protecting the picture screen from burning-in due to a prolonged nonchanging picture, wherein the protection circuit comprises an electric protection switch, having a control input, for suppressing in a switched-off state the luminance signal generated in the video circuit, a detection circuit, having a output, for detecting changes in an electric control signal from said controlling means to the picture signal source, which changes in the control signal would be indicative of active use of said video circuit, and a timer circuit having a start input and an output, the output of the detection circuit being coupled to the start input of the timer circuit, the output of the timer circuit being coupled to the control input of the protection switch, whereby absent an output from said detection circuit, which output would be indicative of active use of said video circuit and which would reset said timer circuit, after a predetermined period of time, said timer circuit causes said protection switch to suppress the luminance signal.

2. A video circuit as claimed in claim 1, wherein the protection switch is included in a supply line between an electric power supply section and a supply input of the luminance circuit.

3. A video circuit as claimed in claim 2, wherein the timer circuit further comprises a supply input which is connected to the supply input of the luminance circuit and wherein the video circuit further comprises a restarting circuit for switching the protection switch on again.

4. A video circuit as claimed in claim 1, wherein the protection switch is arranged in series with the luminance circuit for suppressing the luminance signal in the switched-off state.

5. A video circuit as claimed in claim 1, for displaying color pictures with R-, G- and B-luminance signals of corresponding luminance circuits, wherein the protection switch comprises R-, G- and B- sub-switches which, in a switched-on state of the protection switch, pass the corresponding luminance signals on essentially unchanged, and in a switched-off state of the protection switch, periodically switch the corresponding luminance signals from amplitudes given by the luminance circuits to amplitudes which are complementary thereto, a complementary amplitude being equal to the difference between the maximum and the given amplitudes.

6. A video circuit as claimed in claim 5, which further comprises digital R-, G- and B-luminance circuits for generating luminance signals having at least one one-bit output per color, wherein the protection switch periodically inverts the bit outputs in the switched-off state.

7. A video circuit as claimed in claim 1, which further comprises a carrier oscillator and a modulation circuit for applying a video signal, modulated on a carrier, to an aerial input of a television receiver, wherein the protection switch is arranged in series with the carrier oscillator for suppressing the carrier in the switched-off state.

8. A video circuit as claimed in any of the preceding claims, comprising a carrier oscillator, a modulation circuit, an auxiliary aerial input and an aerial change-over switch, for applying a video signal, modulated on a carrier to an aerial input of a television receiver, the aerial change-over switch coupling in a first switching state the aerial input to an output of the modulation circuit and in a second switching state to the auxiliary aerial input, characterized in that the aerial change-over switch is coupled to the protection switch which in a switched-on state adjusts the aerial change-over switch to the first switching state and in a switched-off state adjusts the aerial change-over switch to the second switching state.

9. A video circuit is claimed in claim 8, wherein the picture signal source has at least one control input for an electric control signal, this control input being coupled to a signal input of the detection circuit for detecting changes in the control signal.

10. A video circuit as claimed in claim 9, which further comprises at least one touch contact for generating an electric control signal, wherein a control signal output of the touch contact is coupled to the signal input of the detection circuit.

11. A video circuit as claimed in claim 10, which further comprises at least one adjustable resistance potentiometer for generating an adjustable analog control signal at the output thereof, wherein the potentiometer is coupled capacitively to a signal input of the detection circuit.

12. A video circuit as claimed in claim 11 wherein the timer circuit is in the form of a restartable monostable multivibrator circuit.

13. A video circuit as claimed in claim 11, wherein the timer circuit is in the form of a digital counting circuit having a resetting input which constitutes the start input of the timer circuit and with a final position output which constitutes the time signal output of the timer circuit.

* * * * *